United States Patent
Hitchcock (10) Patent No.: US 11,370,562 B2
(45) Date of Patent: Jun. 28, 2022

(54) APPARATUS FOR ATTACHING TO AIRCRAFT STRUCTURAL COMPONENT

(71) Applicant: The Boeing Company, Chicago, IL (US)

(72) Inventor: Cory M. Hitchcock, Granite Falls, WA (US)

(73) Assignee: The Boeing Company, Chicago, IL (US)

( * ) Notice: Subject to any disclaimer, the term of this patent is extended or adjusted under 35 U.S.C. 154(b) by 313 days.

(21) Appl. No.: 16/598,179

(22) Filed: Oct. 10, 2019

(65) Prior Publication Data
US 2021/0107686 A1  Apr. 15, 2021

(51) Int. Cl.
*B64F 5/10* (2017.01)
*B64C 1/06* (2006.01)
*B64C 1/40* (2006.01)

(52) U.S. Cl.
CPC ............... *B64F 5/10* (2017.01); *B64C 1/06* (2013.01); *B64C 1/403* (2013.01)

(58) Field of Classification Search
CPC ....... B64C 1/403; B64C 1/406; E04B 1/7629; E04B 1/7633
See application file for complete search history.

(56) References Cited

U.S. PATENT DOCUMENTS

| | | | | |
|---|---|---|---|---|
| 4,668,546 A * | 5/1987 | Hutter, III | ............. | F16B 11/006 156/763 |
| 4,778,702 A * | 10/1988 | Hutter, III | ........... | B29C 65/7855 156/247 |
| 4,822,656 A * | 4/1989 | Hutter, III | ............. | B29C 66/131 156/247 |
| 4,842,912 A * | 6/1989 | Hutter, III | ............... | B29C 65/48 156/763 |
| 5,435,679 A * | 7/1995 | Barry | ........................ | B64C 1/40 411/339 |
| 5,779,193 A * | 7/1998 | Sloan | ...................... | B64C 1/067 52/302.1 |
| 5,866,231 A * | 2/1999 | Bodin | .................... | F16L 59/028 428/196 |
| 7,584,582 B1 * | 9/2009 | Hutter, III | ................. | B64C 1/40 52/407.4 |
| 7,681,923 B2 * | 3/2010 | Negley | ...................... | F16L 5/12 285/139.2 |
| 9,470,257 B2 * | 10/2016 | Balderrama | .......... | F16B 5/0692 |
| 9,809,296 B2 * | 11/2017 | Picot | ...................... | B64C 1/0009 |
| 10,457,377 B2 * | 10/2019 | Nguyen | ..................... | B64C 1/40 |
| 11,161,591 B2 * | 11/2021 | Laib | ...................... | F16B 5/0685 |
| 2018/0356007 A1 * | 12/2018 | Waters | .................. | F16L 3/1222 |

* cited by examiner

*Primary Examiner* — Philip J Bonzell
*Assistant Examiner* — Michael B. Kreiner
(74) *Attorney, Agent, or Firm* — McDonnell Boehnen Hulbert & Berghoff LLP (57) ABSTRACT

Examples include an apparatus for providing a point of attachment to a structural component, the apparatus including: a first grommet comprising: a head; and a shaft that extends from a first side of the head, where the shaft comprises a first attachment component opposite the head; a gasket bonded to a second side of the head that is opposite the first side, where the gasket, the head, and the shaft are aligned and a hole is formed through the gasket, the head, and the shaft; and a second grommet comprising a second attachment component that is configured to engage the first attachment component of the first grommet.

20 Claims, 10 Drawing Sheets

302 — ATTACHING A CLAMP COMPRISING A BOSS TO A STRUCTURAL COMPONENT

304 — PLACING A HEAD OF A FIRST GROMMET HAVING A FIRST SIDE AND A SECOND SIDE OVER THE BOSS SUCH THAT A GASKET ATTACHED TO THE SECOND SIDE FORMS A WATERTIGHT SEAL WITH AN OUTER SURFACE OF THE BOSS, WHEREIN THE FIRST GROMMET INCLUDES (I) A SHAFT THAT EXTENDS FROM THE FIRST SIDE AND (II) A FIRST ATTACHMENT COMPONENT ON THE SHAFT OPPOSITE THE HEAD

306 — FORMING A HOLE THROUGH INSULATION MATERIAL

308 — ATTACHING THE FIRST SIDE TO THE INSULATION MATERIAL SUCH THAT THE FIRST SIDE IS AT A FIRST END OF THE HOLE AND THE SHAFT IS INSIDE THE HOLE

310 — ATTACHING A SECOND ATTACHMENT COMPONENT OF A SECOND GROMMET TO THE FIRST ATTACHMENT COMPONENT FROM A SECOND END OF THE HOLE

FORMING A SECOND WATERTIGHT SEAL BETWEEN A SECOND GASKET THAT IS BONDED TO A SECOND HEAD OF THE SECOND GROMMET AND AN OUTER SURFACE OF THE SHAFT BY INSERTING THE SHAFT THROUGH THE SECOND GASKET

INSERTING A FASTENER THROUGH A RING POST, THE SECOND GROMMET, THE SHAFT, AND THE FIRST GROMMET

314

ENGAGING THE FASTENER WITH THE BOSS

APPARATUS FOR ATTACHING TO AIRCRAFT STRUCTURAL COMPONENT

FIELD

The present disclosure generally relates to an attachment apparatus, and more specifically to an apparatus for providing a point of attachment to a structural component.

BACKGROUND

Many aircraft include fibrous insulation materials positioned near a skin of the aircraft to help regulate temperature within the aircraft. The insulation materials help form a boundary between an interior "warm space" and an exterior "cold space" of the aircraft. The insulation materials are generally not visible in the cabin because the insulation materials are placed between the skin and interior structures of the aircraft. Such aircraft can also include transport elements that are hidden behind interior structures but still inside the warm space. Examples of transport elements include electrical wiring that connects various components of a public address system or that powers lighting fixtures, or flexible tubing that carries water from a reservoir to various locations throughout the aircraft. Such transport elements within the warm space are generally attached to a structural component (e.g., the skin or a stringer) within the cold space. Thus, the transport elements are often attached to structural components through the insulation materials, which can give rise to various problems.

Humans onboard the aircraft will exhale water vapor, which will be dispersed throughout the warm space and the cold space. At high altitudes, much of the water vapor in the cold space will condense and/or freeze. The ice will melt as the airplane descends to lower altitudes. This water will flow downward and can encounter the attachments that connect the transport elements in the warm space to structures in the cold space. However, many conventional attachments do not form watertight seals with the waterproof vapor barriers that cover the insulation material and/or the structural components of the aircraft. This can result in water leaking from the cold space, through the insulation material, and into the warm space. The water can then leak through lighting panels and other cabin fixtures and into the cabin. Thus, a need exists for an apparatus that can attach transport elements to aircraft structural components through insulation material in a watertight fashion.

SUMMARY

One aspect of the disclosure is an apparatus for providing a point of attachment to a structural component, the apparatus comprising: a first grommet comprising: a head; and a shaft that extends from a first side of the head, wherein the shaft comprises a first attachment component opposite the head; a gasket bonded to a second side of the head that is opposite the first side, wherein the gasket, the head, and the shaft are aligned and a hole is formed through the gasket, the head, and the shaft; and a second grommet comprising a second attachment component that is configured to engage the first attachment component of the first grommet.

Another aspect of the disclosure is an attachment system for providing a point of attachment to a structural component, the attachment system comprising: a clamp comprising a boss, wherein the clamp is configured for attachment to the structural component; a first grommet comprising: a head; and a shaft that extends from a first side of the head, wherein the shaft comprises a first attachment component opposite the head; a gasket bonded to a second side of the head that is opposite the first side, wherein the gasket is configured to form a watertight seal with an outer surface of the boss by receiving the boss; a fastener configured to engage the boss; and a second grommet comprising a second attachment component that is configured to engage the first attachment component, wherein the gasket, the head, the shaft, and the second grommet are aligned and a hole is formed through the gasket, the head, the shaft, and the second grommet, the hole being configured to receive the fastener.

A further aspect of the disclosure is a method of installing an attachment system, the method comprising: attaching a clamp comprising a boss to a structural component; placing a head of a first grommet having a first side and a second side over the boss such that a gasket attached to the second side forms a watertight seal with an outer surface of the boss, wherein the first grommet includes (i) a shaft that extends from the first side and (ii) a first attachment component on the shaft opposite the head; forming a hole through insulation material; attaching the first side to the insulation material such that the first side is at a first end of the hole and the shaft is inside the hole; and attaching a second attachment component of a second grommet to the first attachment component from a second end of the hole.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

As discussed above, there exists a need for an apparatus that can attach transport elements to aircraft structural components through insulation material in a watertight fashion.

Within examples, an attachment system provides a point of attachment to a structural component such as a stringer of an aircraft. The attachment system includes a clamp comprising a boss. The clamp is configured for attachment (e.g., clamping) to the structural component. The system also includes a first grommet that includes a head (e.g., a ring-shaped head) and a shaft that extends from a first side of the head. The shaft includes a first attachment component opposite the head (e.g., an attachment component that extends radially outward from the shaft). The attachment system also includes a gasket bonded to a second side of the head that is opposite the first side. The gasket is configured to form a watertight seal with an outer surface of the boss by receiving the boss. The attachment system also includes a fastener (e.g., a threaded bolt) configured to engage the boss, and a second grommet comprising a second attachment component that is configured to engage the first attachment component. The gasket, the head, the shaft, and the second grommet are aligned and a hole is formed through the gasket, the head, the shaft, and the second grommet. The hole is configured to receive the fastener.

To install the attachment system, a technician attaches the clamp to the structural component and places the head of the first grommet over the boss such that the gasket forms a watertight seal with the outer surface of the boss. The technician can form (e.g., punch) a hole through insulation material that is adjacent to the structural component. The technician can also attach (e.g., via adhesive) the first side of the head to the insulation material (e.g., an outboard side of the insulation material) such that the first side of the head is at a first end of the hole through the insulation material and the shaft is inside the hole through the insulation material. Additionally, the technician can attach the second attachment component of the second grommet to the first attachment component from a second end of the hole through the insulation material. The technician can also attach the second grommet to an inboard side of the insulation material via adhesive.

The attachment system can be advantageous when compared to conventional systems because the attachment system is generally capable of piercing insulation material and forming watertight seals on inboard and/or outboard sides of the insulation material.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Figure 11:
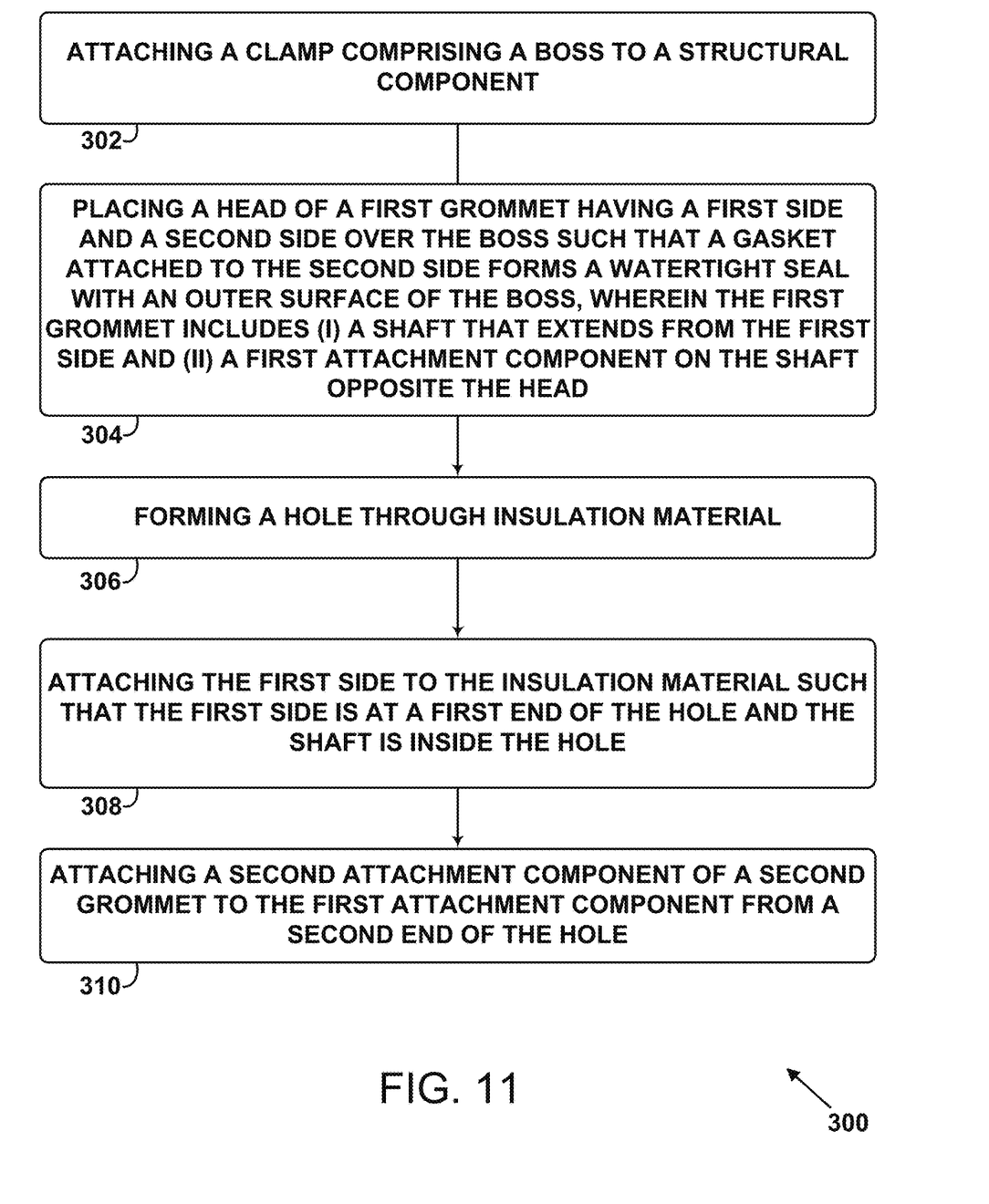
FIG. 11 is a block diagram of a method, according to an example.
Figure 12:
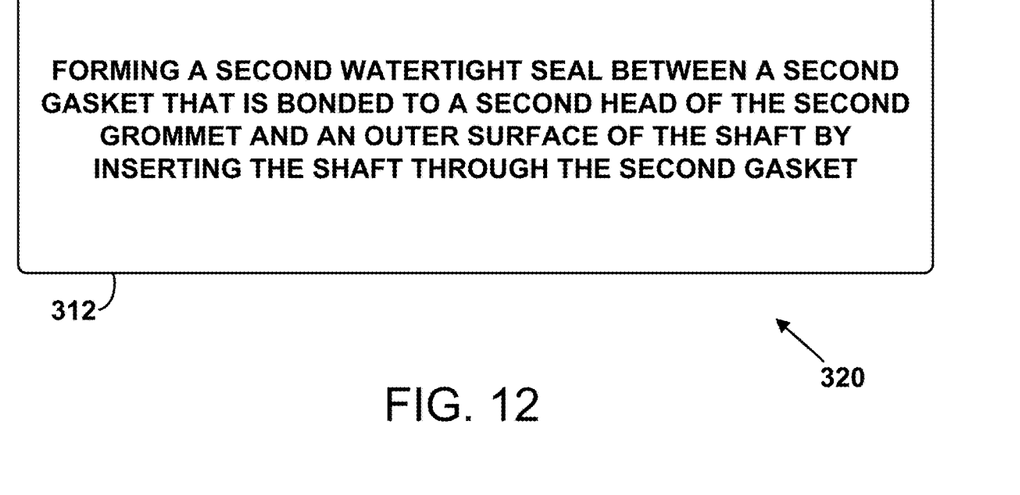
FIG. 12 is a block diagram of a method, according to an example.
Figure 13:
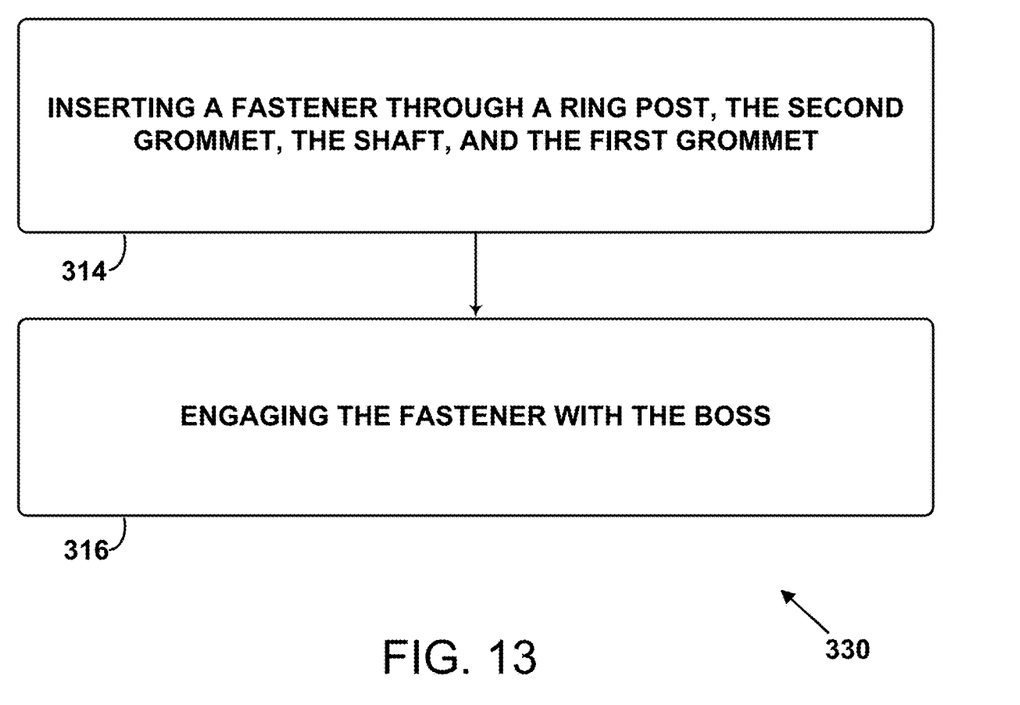
FIG. 13 is a block diagram of a method, according to an example.

FIGS. 1-4 depict an apparatus 100 and functionality related to a method 300, a method 320, and a method 330 shown respectively in FIG. 11, FIG. 12, and FIG. 13.

Figure 1:
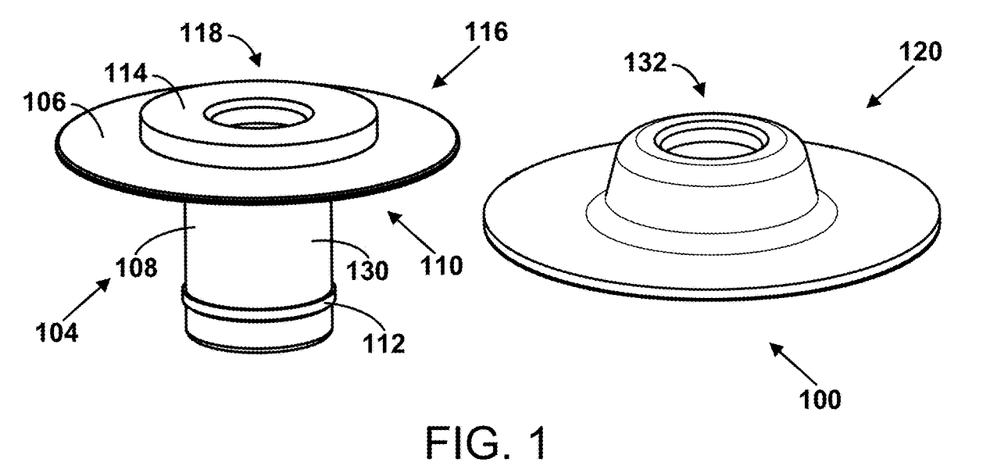
FIG. 1 is a front view of an apparatus in an unassembled state, according to an example.
Figure 2:
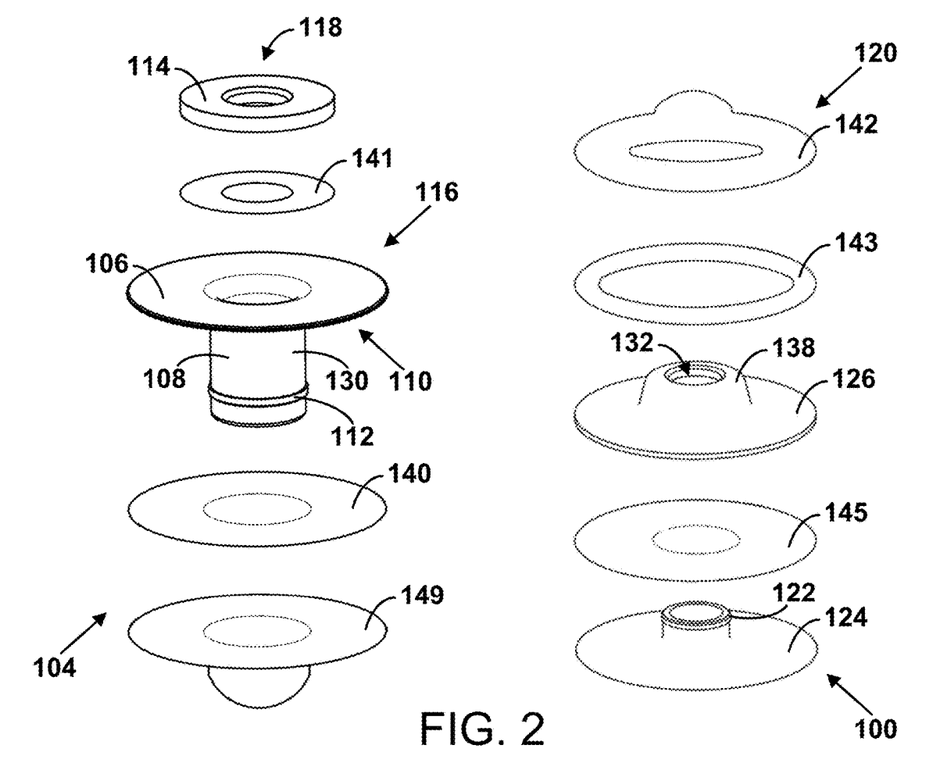
FIG. 2 is an exploded view of an apparatus, according to an example.
Figure 5:
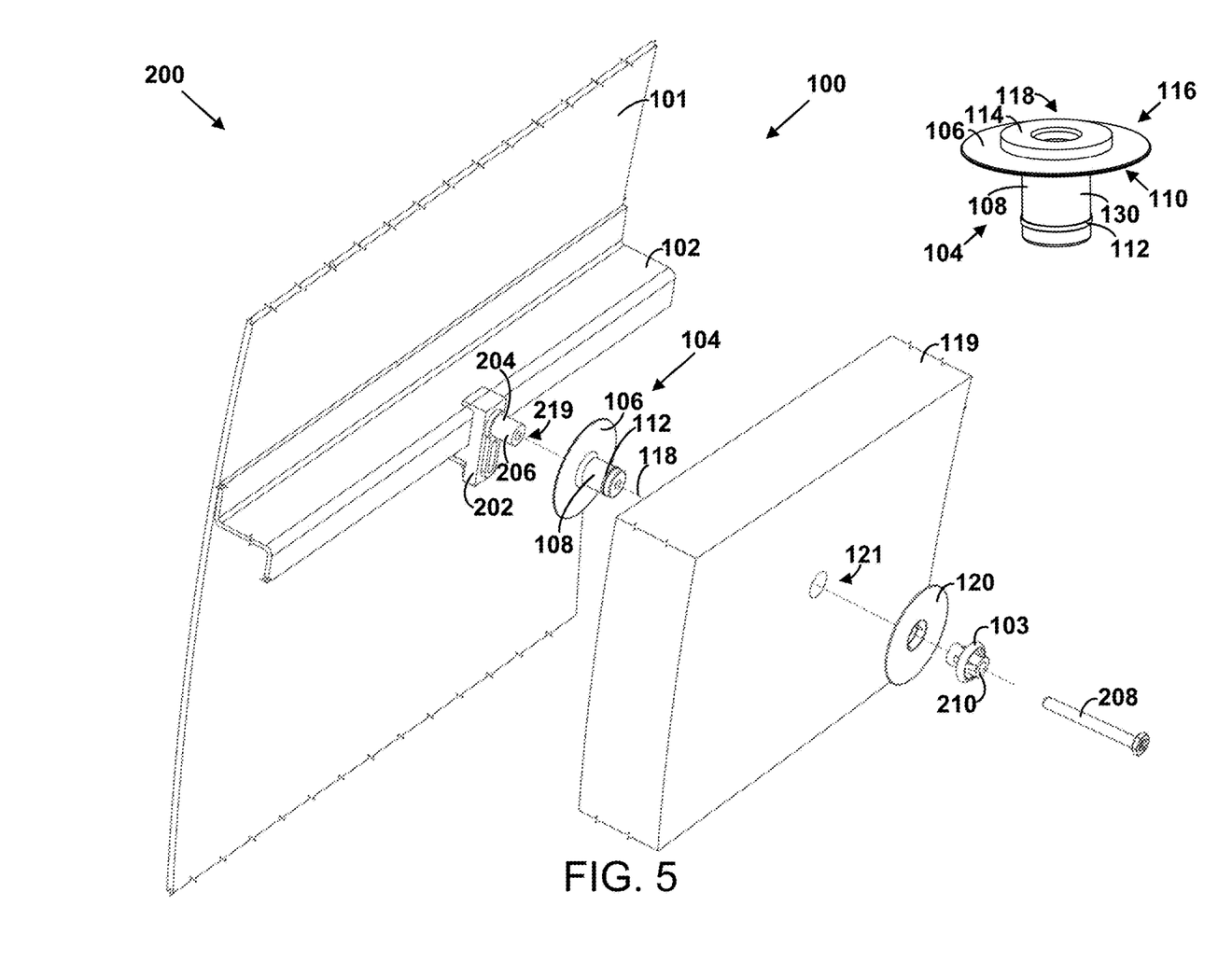
FIG. 5 is an exploded view of an attachment system, according to an example.

FIG. 1 is a front view of the apparatus 100 with the first grommet 104 and the second grommet 120 being unattached to each other. The apparatus 100 can provide a point of attachment to a structural component of an aircraft. As shown in FIG. 1, the apparatus 100 includes the first grommet 104. The first grommet 104 further includes a head 106 and a shaft 108 that that extends from a first side 110 of the head 106. The shaft 108 includes a first attachment component 112 opposite the head 106. The apparatus 100 also includes a gasket 114 bonded to a second side 116 of the head 106 that is opposite the first side 110. The gasket 114, the head 106, and the shaft 108 are aligned and a hole 118 is formed through the gasket 114, the head 106, and the shaft 108. The hole 118 through the shaft 108 is shown in FIG. 5 and described below. The apparatus 100 also includes the second grommet 120 that includes a second attachment component that is configured to engage the first attachment component 112 of the first grommet 104. The second attachment component is illustrated in FIG. 2, as described below.

The first grommet 104 can be formed of plastic or other lightweight materials. The head 106 is substantially annular (e.g., ring-shaped) and the shaft 108 has a cylindrical shape. The first attachment component 112 extends radially outward from the shaft 108, taking the form of a circular ridge.

The gasket 114 is bonded to the second side 116 of the head 106 via an adhesive material (e.g, acrylic, resin, epoxy, or pressure sensitive adhesive). The gasket 114 can be formed of vulcanized rubber, plastic, or similar materials configured for forming a watertight seal with objects that are received through the hole 118 in the gasket 114. In other examples, the hole in the gasket can be shaped differently from what is shown in FIG. 1, but will generally match the shape of the shaft of the first grommet.

The second grommet 120 can be formed of plastic, rubber, or other lightweight materials, similar to the first grommet 104.

FIG. 2 is an exploded view of the apparatus 100. The apparatus 100 includes an adhesive material 140 that is disposed on the first side 110 of the head 106 of the first grommet 104. The apparatus 100 also includes a removable tab 149 (e.g., a paper or plastic tab) that covers the adhesive material 140 on the first grommet 104. A technician can remove the removable tab 149 to expose the adhesive material 140 and attach the first side 110 of the head 106 to insulation material using the adhesive material 140, as discussed below. The gasket 114 is bonded to the second side 116 of the head 106 via an adhesive material 141.

The second grommet 120 includes a second head 124 (e.g., a substantially annular head). The apparatus 100 further includes a second gasket 126 that is bonded to the second head 124 and configured to form a watertight seal with an outer surface 130 of the shaft 108 of the first grommet 104 by receiving the shaft 108 through a second hole 132 of the second gasket 126. The second grommet 120 includes a second attachment component 122 that is configured to engage the first attachment component 112 of the first grommet 104. That is, the first attachment component 112 and the second attachment component 122 are configured to form a snap-fit connection. The second gasket 126 includes a raised portion 138 that surrounds the second hole 132. Additionally, an adhesive material 143 is disposed on the second gasket 126 facing away from the second head 124. A removable tab 142 covers the adhesive material 143 on the second gasket 126. A technician can remove the removable tab 142 to expose the adhesive material 143 and attach the second gasket 126 (e.g., the second grommet 120) to insulation material using the adhesive material 143, as discussed below. An adhesive material 145 bonds the second gasket 126 to the second head 124.

Figure 3:
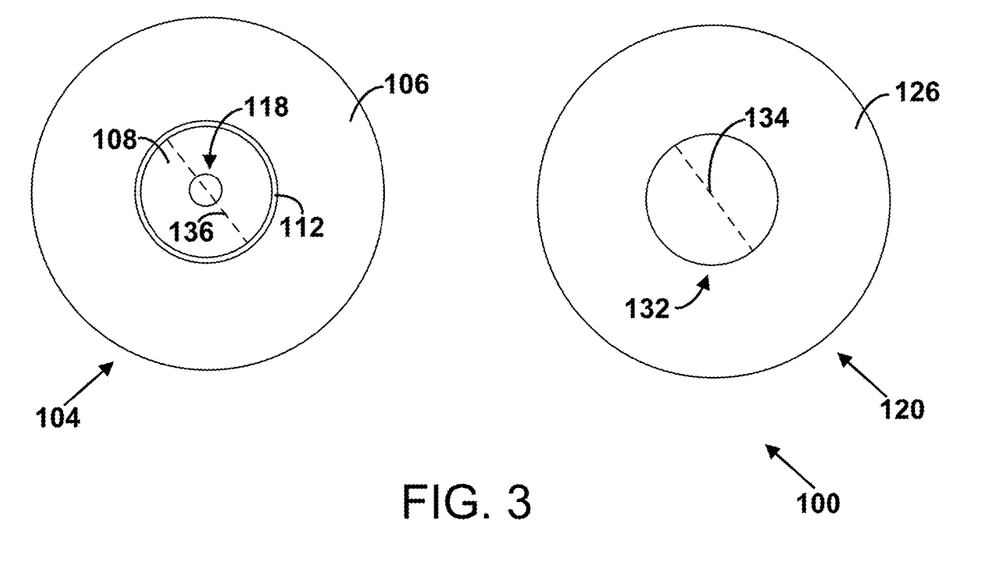
FIG. 3 is a bottom view of a first grommet and a top view of a second grommet, according to an example.

FIG. 3 is a bottom view of the first grommet 104 and a top view of the second grommet 120. The second hole 132 has a diameter 134 that is less than an outer diameter 136 of the shaft 108 when the second gasket 126 is not under tension or compression. That is, the diameter 134 is less than the outer diameter 136 when the second gasket is at rest.

Figure 4:
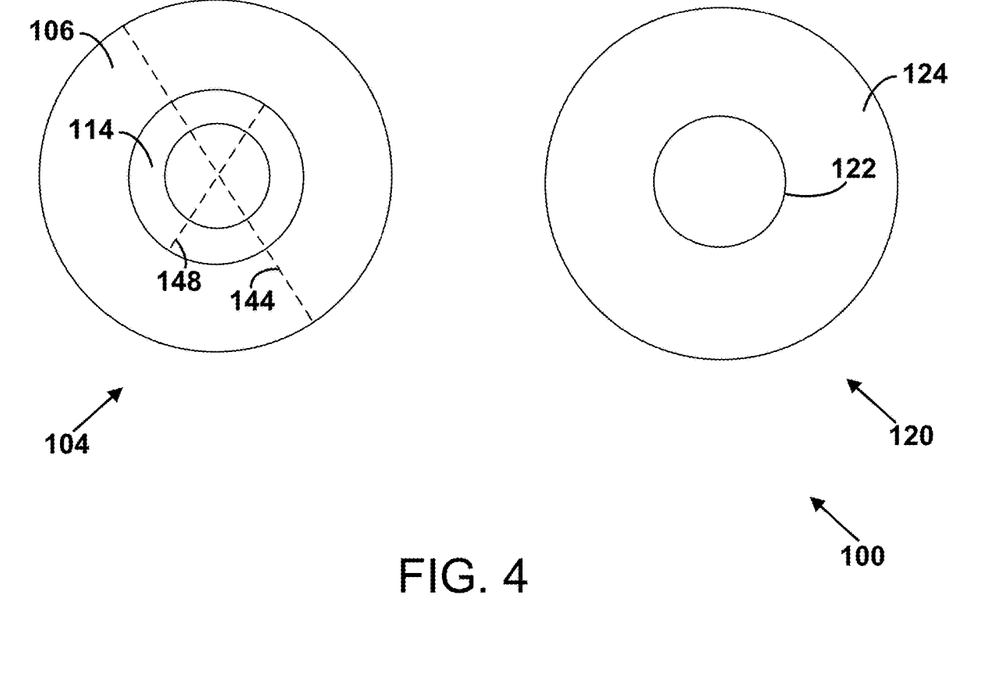
FIG. 4 is a top view of a first grommet and a top view of a second head, according to an example.

FIG. 4 is a top view of the first grommet 104 and a top view of the second head 124 disengaged with the second gasket 126. An outer diameter 144 of the head 106 of the first grommet 104 is greater than the outer diameter 136 of the shaft 108 of the first grommet 104. An outer diameter 148 of the gasket 114 of the first grommet 104 is less than the outer diameter 144 of the head 106 of the first grommet 104.

FIG. 5 is an exploded view of an attachment system 200 for providing a point of attachment 103 to a structural component 102. The upper right portion of FIG. 5 includes an alternative view of the first grommet 104 for additional reference.

The point of attachment 103 takes the form of a circular ring of a ring post 210. For example, flexible tubing for carrying water or electrical wiring can be routed through the ring post 210 (e.g., routed through a series of ring posts dispersed throughout an aircraft). As shown in FIG. 5, the structural component 102 takes the form of a stringer that is bonded to a skin 101 of an aircraft, but other examples are possible.

The attachment system 200 includes a clamp 202 comprising a boss 204. The clamp 202 is configured for attachment to the structural component 102. The attachment system 200 also includes the first grommet 104 that includes the head 106 and the shaft 108 that extends from the first side 110 of the head 106. The shaft 108 includes the first attachment component 112 opposite the head 106. The attachment system 200 also includes the gasket 114 bonded to the second side 116 of the head 106 that is opposite the first side 110. The gasket 114 is configured to form a watertight seal with an outer surface 206 of the boss 204 by receiving the boss 204. The attachment system 200 also includes a fastener 208 configured to engage the boss 204. The attachment system 200 also includes the second grommet 120 including the second attachment component (e.g., hidden inside the second grommet 120) that is configured to engage the first attachment component 112. The gasket 114, the head 106, the shaft 108, and the second grommet 120 are aligned and a hole 118 is formed through the gasket 114, the head 106, the shaft 108, and the second grommet 120. The hole 118 is configured to receive the fastener 208.

The clamp 202 can be formed of plastic or other lightweight materials and is configured to clamp to the structural component 102 via tightening of a screw that pulls two opposite sides of the clamp 202 together against the structural component 102. The boss 204 is cylindrically shaped, however in other examples the boss can have other shapes. The boss 204 includes a hole 219 (e.g., a threaded hole) for receiving the fastener 208. The hole 219 can be considered part of the hole 118.

The gasket 114 is configured to fit over the boss 204 to form a watertight seal with the outer surface 206 of the boss 204. Thus, the gasket 114 generally has a shape similar to that of the boss 204.

The fastener 208 can take the form of a threaded bolt or a screw, but other examples are possible.

When the attachment system 200 is assembled, the shaft 108 is at least partially inside a hole 121 in an insulation material 119. The hole 121 can be considered part of the hole 118 as well.

The attachment system 200 further includes the ring post 210 that is configured to provide the point of attachment 103 for a transport element. The fastener 208 is configured to secure the ring post 210 to the second grommet 120 by inserting the fastener 208 through the ring post 210, the hole 121, and the hole 118, and engaging the boss 204.

Figure 6:
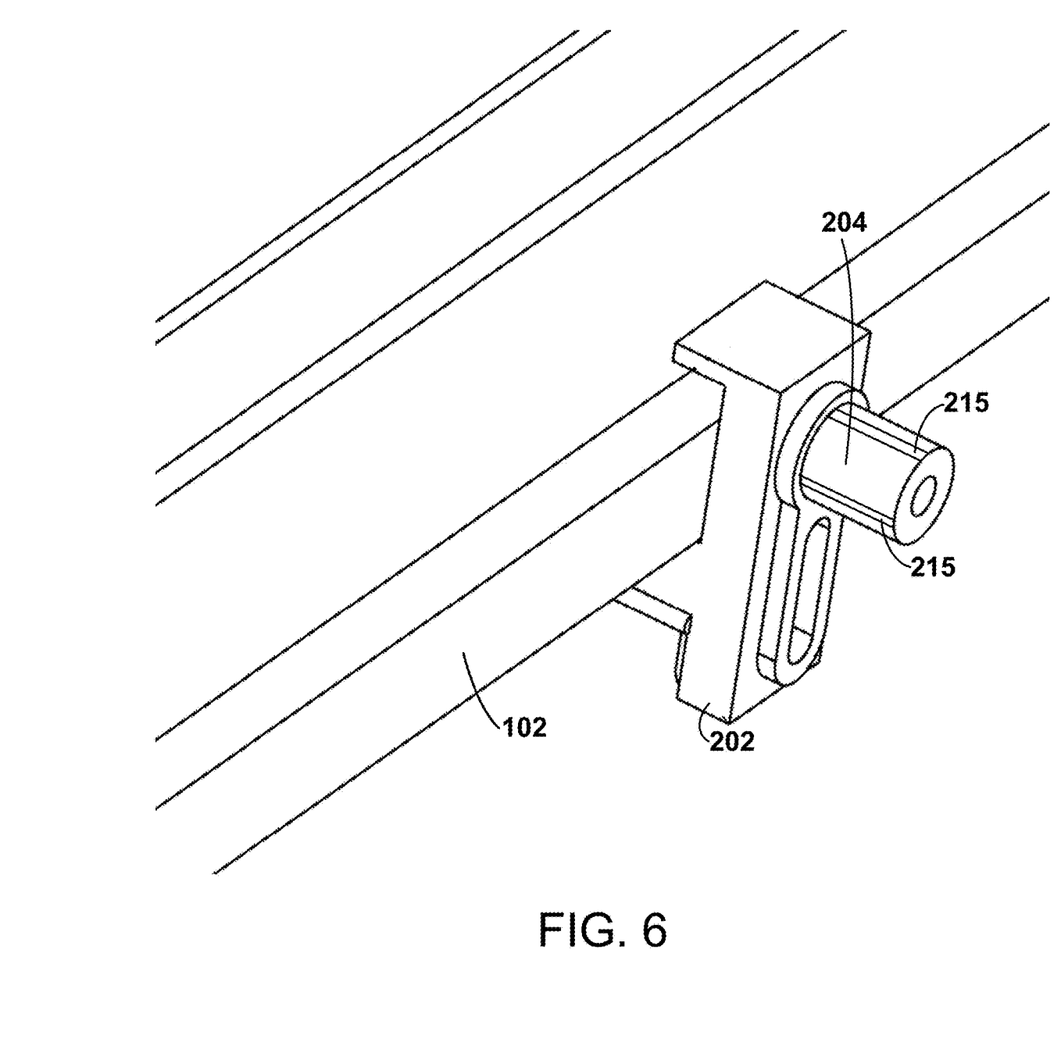
FIG. 6 is a close up view of a clamp, according to an example.

FIG. 6 is a close up view of the clamp 202. As shown, the boss 204 includes ribs 215 that are raised with respect to the outer surface of the boss 204. The gasket attached to the first grommet is configured to form the watertight seal additionally with the ribs 215.

Figure 7:
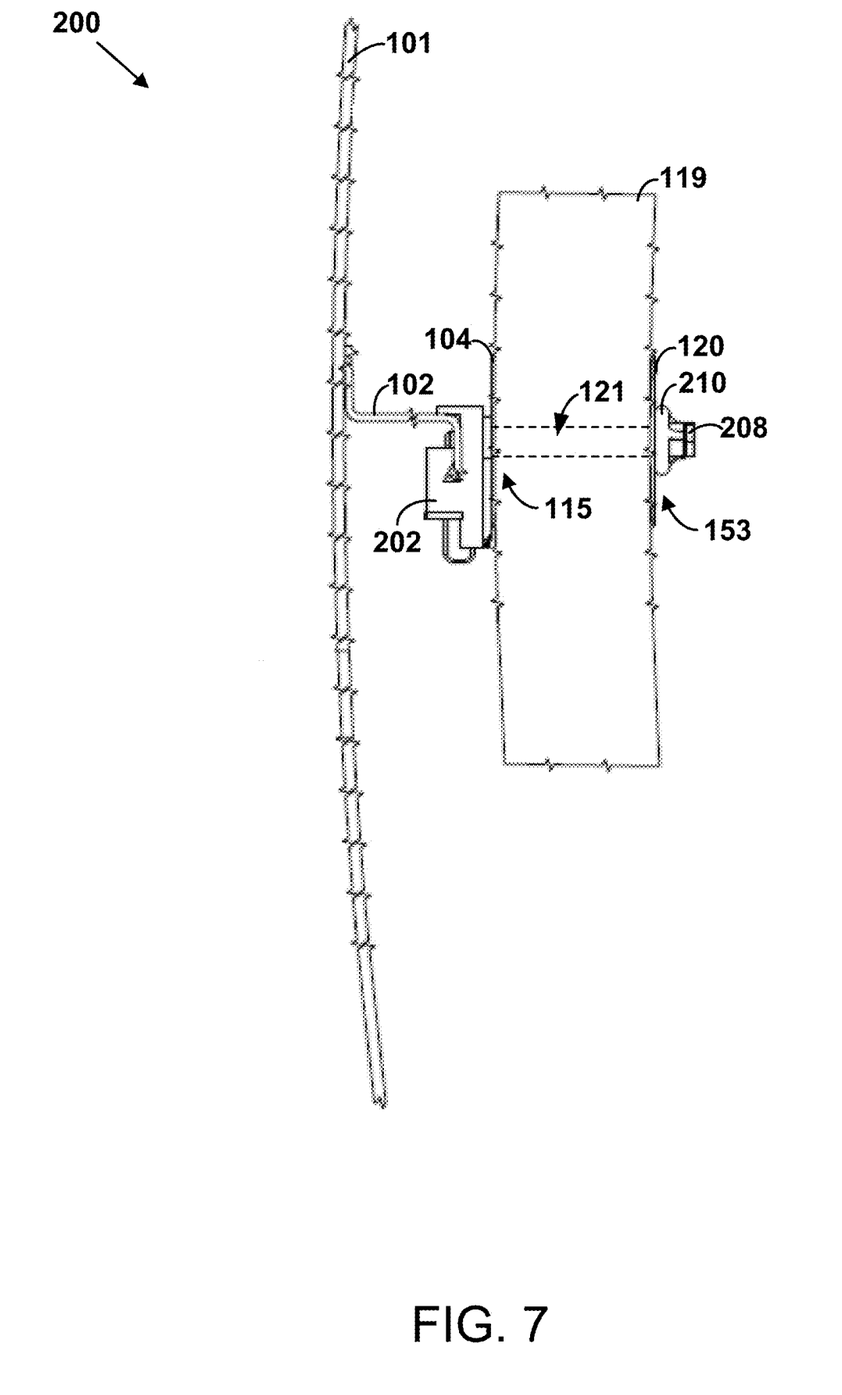
FIG. 7 is a side view of an attachment system, according to an example.

FIG. 7 is a side view of the attachment system 200. As shown, the first grommet 104 and the second grommet 120 are secured to the insulation material 119 on opposite sides of the insulation material 119. That is, the first grommet 104 is attached adjacent to a first end 115 of the hole 121 within the insulation material 119 and the second grommet 120 is attached adjacent to a second end 153 of the hole 121 within the insulation material 119. The hole 121 can form part of the hole 118 shown in FIG. 5.

Figure 8:
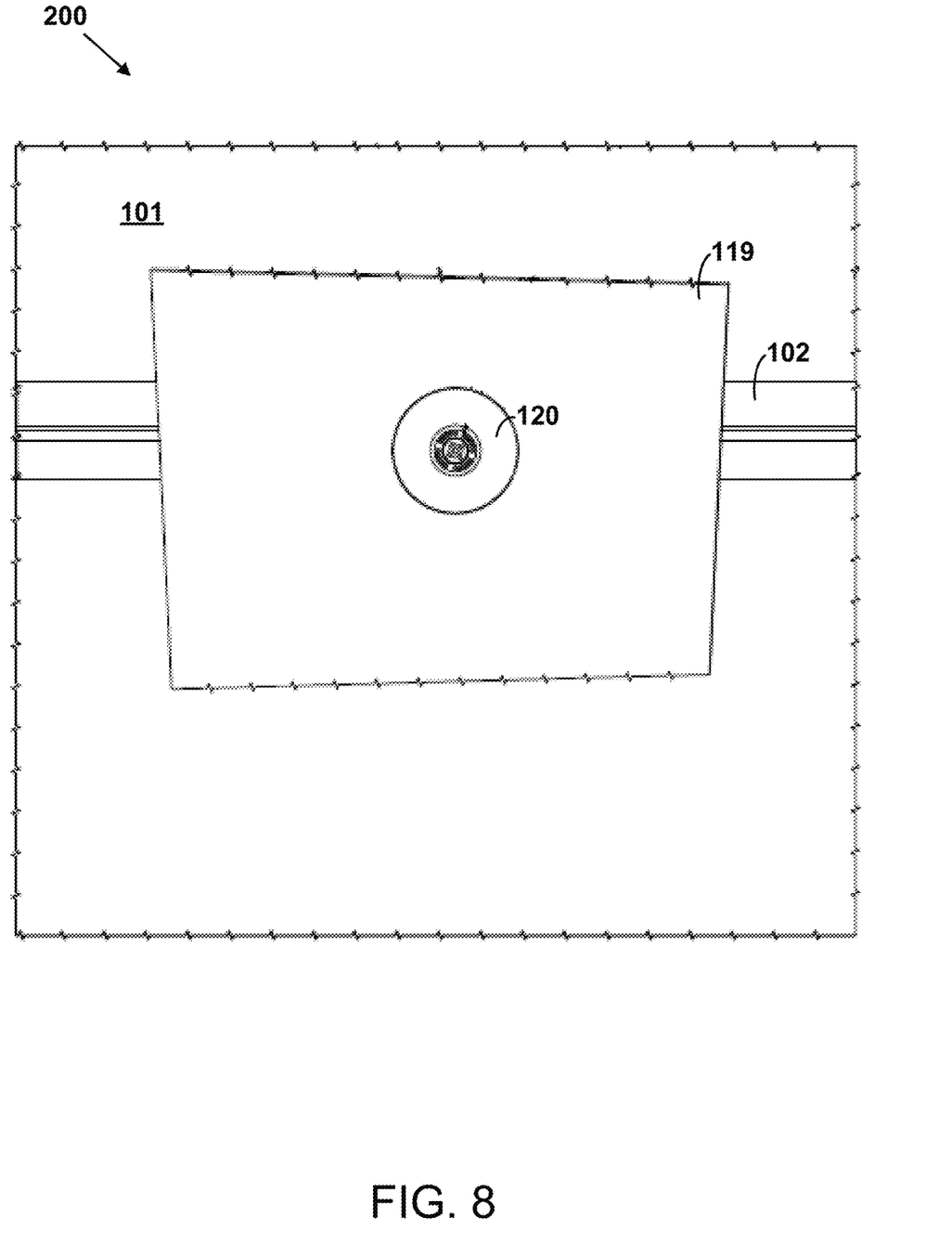
FIG. 8 is a front view of an attachment system, according to an example.

FIG. 8 is a front view of the attachment system 200.

Figure 9:
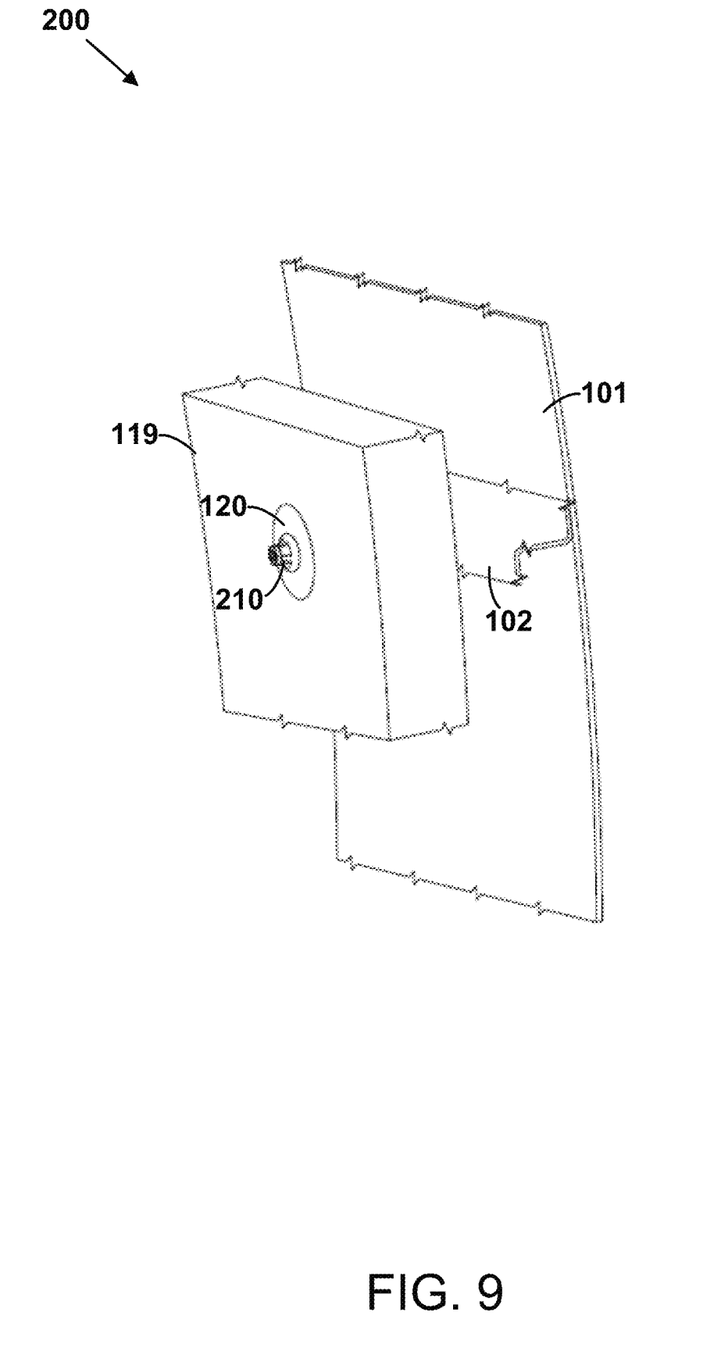
FIG. 9 is a perspective view of an attachment system, according to an example.

FIG. 9 is a perspective view of the attachment system 200.

Figure 10:
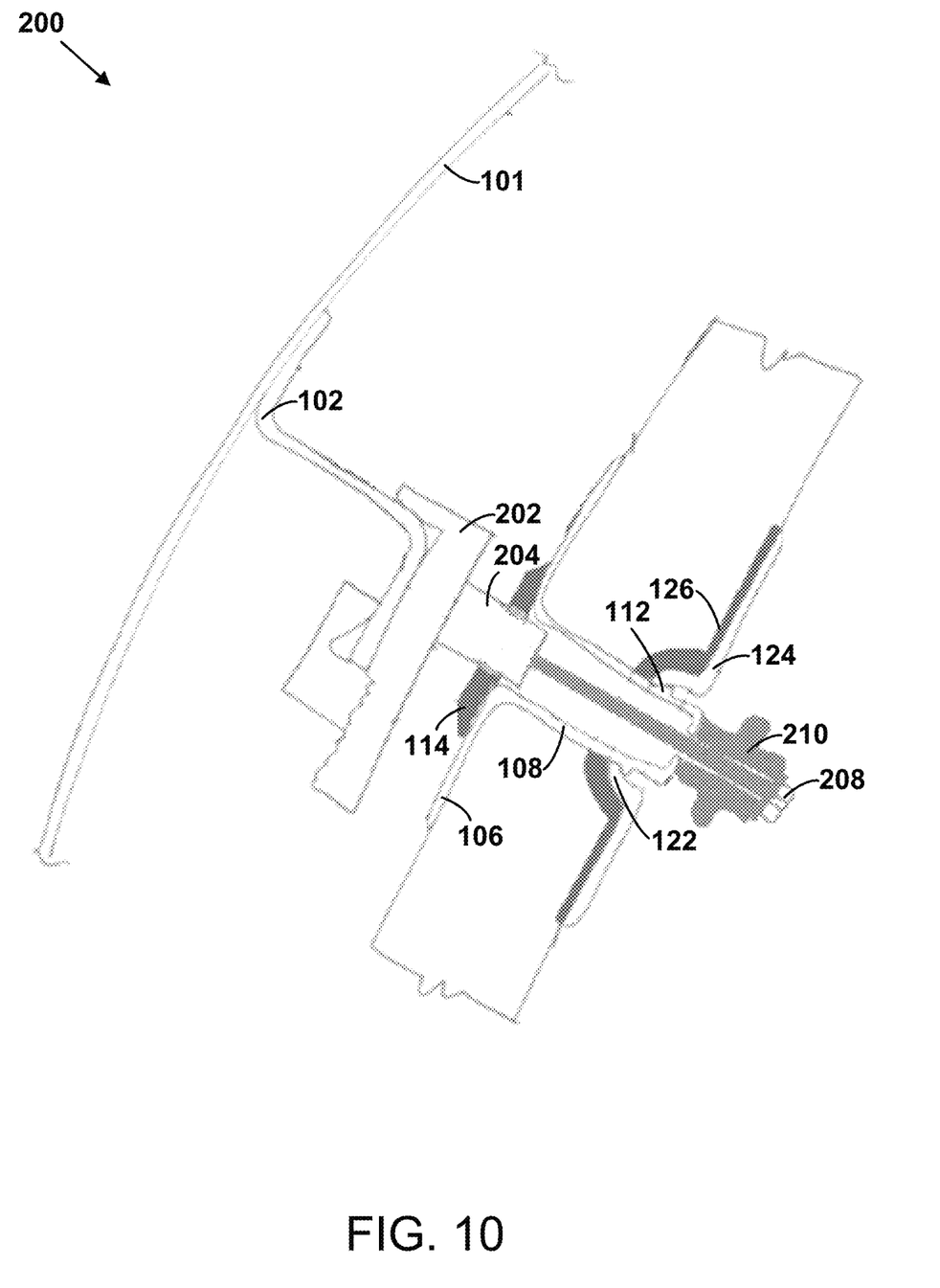
FIG. 10 is a cross sectional view of an attachment system, according to an example.

FIG. 10 is a cross sectional view of the attachment system 200 as assembled.

FIG. 11 is a block diagram of the method 300. FIG. 11 shows a flowchart of the method 300 of installing the attachment system 200, according to example implementations. The method 300 presents an example of a method that could be used with the apparatus 100 and/or the attachment system 200 shown in FIGS. 1-10. As shown in FIG. 11, the method 300 includes one or more operations, functions, or actions as illustrated by blocks 302, 304, 306, 308, and 310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 302, the method 300 includes attaching the clamp 202 comprising the boss 204 to the structural component 102.

At block 304, the method 300 includes placing the head 106 of the first grommet 104 having the first side 110 and the second side 116 over the boss 204 such that the gasket 114 attached to the second side 116 forms a watertight seal with the outer surface 206 of the boss 204. The first grommet 104 includes (i) the shaft 108 that extends from the first side 110 and (ii) the first attachment component 112 on the shaft 108 opposite the head 106.

At block 306, the method 300 includes forming the hole 121 through the insulation material 119. The hole 121 can be formed using a punching tool, as described above. That is, the hole 121 is formed via punching or cutting.

At block 308, the method 300 includes attaching the first side 110 to the insulation material 119 such that the first side 110 is at the first end 115 of the hole 121 (e.g., against the insulation material 119) and the shaft 108 is inside the hole 121.

At block 310, the method 300 includes attaching the second attachment component 122 of the second grommet 120 to the first attachment component 112 from the second end 153 of the hole 121.

FIG. 12 is a block diagram of the method 320. FIG. 12 shows a flowchart of the method 320 of installing the attachment system 200, according to example implementations. The method 320 presents an example of a method that could be used with the apparatus 100 and/or the attachment system 200 shown in FIGS. 1-10.

At block 312, the method 320 includes forming a second watertight seal between the second gasket 126 that is bonded to the second head 124 of the second grommet 120 and an outer surface 130 of the shaft 108 by inserting the shaft 108 through the second gasket 126. As such, the second attachment component 122 is configured to mechanically couple to the first attachment component 112 whereas the second gasket 126 is configured to form the second watertight seal with the outer surface 130 of the shaft 108.

FIG. 13 is a block diagram of the method 330. FIG. 13 shows a flowchart of the method 330 of installing the attachment system 200, according to example implementations. The method 330 presents an example of a method that could be used with the apparatus 100 and/or the attachment system 200 shown in FIGS. 1-10. As shown in FIG. 13, the method 330 includes one or more operations, functions, or actions as illustrated by blocks 314 and 316. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 314, the method 330 includes inserting the fastener 208 through the ring post 210, the second grommet 120, the shaft 108, and the first grommet 104.

At block 316, the method 330 includes engaging the fastener 208 with the boss 204.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Examples of the present disclosure can thus relate to one of the enumerated clauses (ECs) listed below.

EC 1 is an apparatus for providing a point of attachment to a structural component, the apparatus comprising: a first grommet comprising: a head; and a shaft that extends from a first side of the head, wherein the shaft comprises a first attachment component opposite the head; a gasket bonded to a second side of the head that is opposite the first side, wherein the gasket, the head, and the shaft are aligned and a hole is formed through the gasket, the head, and the shaft; and a second grommet comprising a second attachment component that is configured to engage the first attachment component of the first grommet.

EC 2 is the apparatus of EC 1, wherein the second grommet comprises a second head, the apparatus further comprising a second gasket that is bonded to the second head and configured to form a watertight seal with an outer surface of the shaft of the first grommet by receiving the shaft through a second hole of the second gasket.

EC 3 is the apparatus of EC 2, wherein the second hole has a diameter that is less than an outer diameter of the shaft when the second gasket is not under tension or compression.

EC 4 is the apparatus of any of ECs 2-3, wherein the second gasket comprises a raised portion that surrounds the second hole.

EC 5 is the apparatus of any of ECs 2-4, further comprising an adhesive material disposed on the second gasket facing away from the second head.

EC 6 is the apparatus of EC 5, further comprising a removable tab that covers the adhesive material on the second gasket.

EC 7 is the apparatus of any of ECs 1-6, wherein the head has a substantially annular shape.

EC 8 is the apparatus of any of ECs 1-7, wherein the first attachment component extends radially outward from the shaft.

EC 9 is the apparatus of any of ECs 1-8, wherein an outer diameter of the head of the first grommet is greater than an outer diameter of the shaft of the first grommet.

EC 10 is the apparatus of any of ECs 1-9, wherein an outer diameter of the gasket of the first grommet is less than an outer diameter of the head of the first grommet.

EC 11 is the apparatus of any of ECs 1-10, further comprising an adhesive material disposed on the first side of the head of the first grommet.

EC 12 is the apparatus of EC 11, further comprising a removable tab that covers the adhesive material on the first grommet.

EC 13 is an attachment system for providing a point of attachment to a structural component, the attachment system comprising: a clamp comprising a boss, wherein the clamp is configured for attachment to the structural component; a first grommet comprising: a head; and a shaft that extends from a first side of the head, wherein the shaft comprises a first attachment component opposite the head; a gasket bonded to a second side of the head that is opposite the first side, wherein the gasket is configured to form a watertight seal with an outer surface of the boss by receiving the boss; a fastener configured to engage the boss; and a second grommet comprising a second attachment component that is configured to engage the first attachment component, wherein the gasket, the head, the shaft, and the second grommet are aligned and a hole is formed through the gasket, the head, the shaft, and the second grommet, the hole being configured to receive the fastener.

EC 14 is the attachment system of EC 13, further comprising a ring post configured to provide the point of attachment for a transport element, wherein the fastener is configured to secure the ring post to the second grommet by inserting the fastener through the ring post and the hole and engaging the boss.

EC 15 is the attachment system of any of ECs 13-14, further comprising an adhesive material disposed on the first side.

EC 16 is the attachment system of any of ECs 13-15, wherein the second grommet comprises a second head, the attachment system further comprising a second gasket that is bonded to the second head and configured to form a second watertight seal with an outer surface of the shaft by receiving the shaft through a second hole of the second gasket.

EC 17 is the attachment system of EC 16, wherein the boss comprises a rib that is raised with respect to the outer surface of the shaft, and wherein the gasket is configured to form the watertight seal additionally with the rib.

EC 18 is a method of installing an attachment system, the method comprising: attaching a clamp comprising a boss to a structural component; placing a head of a first grommet having a first side and a second side over the boss such that a gasket attached to the second side forms a watertight seal with an outer surface of the boss, wherein the first grommet includes (i) a shaft that extends from the first side and (ii) a first attachment component on the shaft opposite the head;

forming a hole through insulation material; attaching the first side to the insulation material such that the first side is at a first end of the hole and the shaft is inside the hole; and attaching a second attachment component of a second grommet to the first attachment component from a second end of the hole.

EC 19 is the method of EC 18, further comprising forming a second watertight seal between a second gasket that is bonded to a second head of the second grommet and an outer surface of the shaft by inserting the shaft through the second gasket.

EC 20 is the method of any of ECs 18-19, further comprising: inserting a fastener through a ring post, the second grommet, the shaft, and the first grommet; and engaging the fastener with the boss.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. An apparatus for providing a point of attachment to a structural component, the apparatus comprising:
    a first grommet comprising:
        a head; and
        a shaft that extends from a first side of the head, wherein the shaft comprises a first attachment component opposite the head;
    a gasket bonded to a second side of the head that is opposite the first side, wherein the gasket, the head, and the shaft are aligned and a hole is formed through the gasket, the head, and the shaft; and
    a second grommet comprising a second attachment component that is configured to engage the first attachment component of the first grommet.

2. The apparatus of claim 1, wherein the second grommet comprises a second head, the apparatus further comprising a second gasket that is bonded to the second head and configured to form a watertight seal with an outer surface of the shaft of the first grommet by receiving the shaft through a second hole of the second gasket.

3. The apparatus of claim 2, wherein the second hole has a diameter that is less than an outer diameter of the shaft when the second gasket is not under tension or compression.

4. The apparatus of claim 2, wherein the second gasket comprises a raised portion that surrounds the second hole.

5. The apparatus of claim 2, further comprising an adhesive material disposed on the second gasket facing away from the second head.

6. The apparatus of claim 5, further comprising a removable tab that covers the adhesive material on the second gasket.

7. The apparatus of claim 1, wherein the head has a substantially annular shape.

8. The apparatus of claim 1, wherein the first attachment component extends radially outward from the shaft.

9. The apparatus of claim 1, wherein an outer diameter of the head of the first grommet is greater than an outer diameter of the shaft of the first grommet.

10. The apparatus of claim 1, wherein an outer diameter of the gasket of the first grommet is less than an outer diameter of the head of the first grommet.

11. The apparatus of claim 1, further comprising an adhesive material disposed on the first side of the head of the first grommet.

12. The apparatus of claim 11, further comprising a removable tab that covers the adhesive material on the first grommet.

13. An attachment system for providing a point of attachment to a structural component, the attachment system comprising:
    a clamp comprising a boss, wherein the clamp is configured for attachment to the structural component;
    a first grommet comprising:
        a head; and
        a shaft that extends from a first side of the head, wherein the shaft comprises a first attachment component opposite the head;
    a gasket bonded to a second side of the head that is opposite the first side, wherein the gasket is configured to form a watertight seal with an outer surface of the boss by receiving the boss;
    a fastener configured to engage the boss; and
    a second grommet comprising a second attachment component that is configured to engage the first attachment component, wherein the gasket, the head, the shaft, and the second grommet are aligned and a hole is formed through the gasket, the head, the shaft, and the second grommet, the hole being configured to receive the fastener.

14. The attachment system of claim 13, further comprising a ring post configured to provide the point of attachment for a transport element, wherein the fastener is configured to secure the ring post to the second grommet by inserting the fastener through the ring post and the hole and engaging the boss.

15. The attachment system of claim 13, further comprising an adhesive material disposed on the first side.

16. The attachment system of claim 13, wherein the second grommet comprises a second head, the attachment system further comprising a second gasket that is bonded to the second head and configured to form a second watertight seal with an outer surface of the shaft by receiving the shaft through a second hole of the second gasket.

17. The attachment system of claim 16, wherein the boss comprises a rib that is raised with respect to the outer surface of the shaft, and wherein the gasket is configured to form the watertight seal additionally with the rib.

18. A method of installing the attachment system of claim 13, the method comprising:
    attaching the clamp to the structural component;
    placing the head over the boss such that the gasket forms the watertight seal with the outer surface;
    forming a second hole through insulation material;
    attaching the first side to the insulation material such that the first side is at a first end of the second hole and the shaft is inside the second hole; and
    attaching the second attachment component to the first attachment component from a second end of the second hole.

19. The method of claim 18, further comprising forming a second watertight seal between a second gasket that is bonded to a second head of the second grommet and an outer surface of the shaft by inserting the shaft through the second gasket.

20. The method of claim 18, further comprising:
inserting the fastener through a ring post, the second grommet, the shaft, and the first grommet; and
engaging the fastener with the boss.

\* \* \* \* \*